United States Patent [19]

Jalbert

[11] Patent Number: 4,930,726
[45] Date of Patent: Jun. 5, 1990

[54] BUILT-IN CONTROL FLAPS FOR A MULTI-CELL WING TYPE CANOPY

[76] Inventor: Domina C. Jalbert, 425 Wavecrest Ct., Boca Raton, Fla. 33432

[21] Appl. No.: 288,469

[22] Filed: Dec. 22, 1988

[51] Int. Cl.⁵ .............................................. B64C 9/00
[52] U.S. Cl. ................... 244/90 R; 244/152; 244/145; 244/144; 244/146; 244/900
[58] Field of Search .............. 244/152, 144, 145, 146, 244/900, 902, 904, 90 R

[56] References Cited

U.S. PATENT DOCUMENTS

| | | | |
|---|---|---|---|
| 3,796,398 | 3/1974 | Eilertson | 244/902 |
| 4,191,349 | 3/1980 | Pravaz | 244/152 |
| 4,729,530 | 3/1988 | Jalbert | 244/145 |

Primary Examiner—Joseph F. Peters, Jr.
Assistant Examiner—Anne Sartelle
Attorney, Agent, or Firm—Jack N. McCarthy

[57] ABSTRACT

A built-in control flap for a ram air, multi-cell, wing type canopy having a ram air inlet is located in each side of the canopy at the rear portion thereof. Each built-in control flap is separated from the adjacent center portion of the canopy between the control flaps. A seal and guide of a sheet of flexible material connects the top of each control flap to the bottom of the adjacent center portion of the canopy across the separation for directing air flow thereby when a control flap is down. Each control flap receives air flow from the ram air inlet.

18 Claims, 4 Drawing Sheets

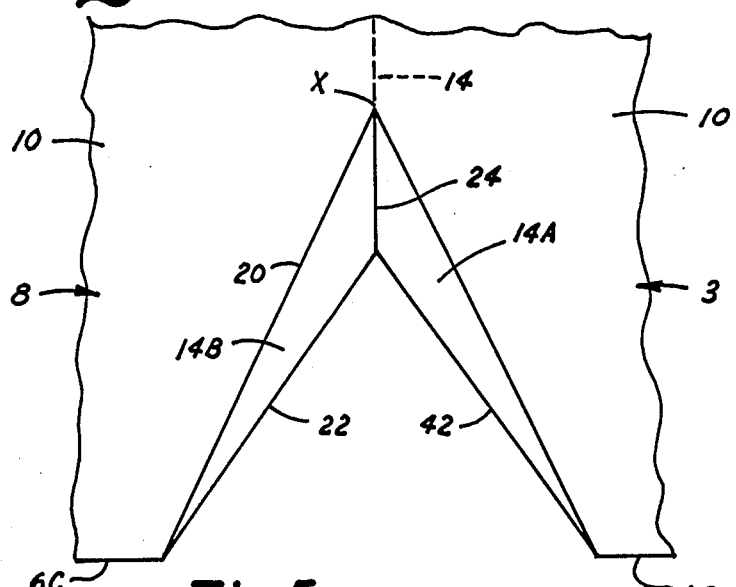
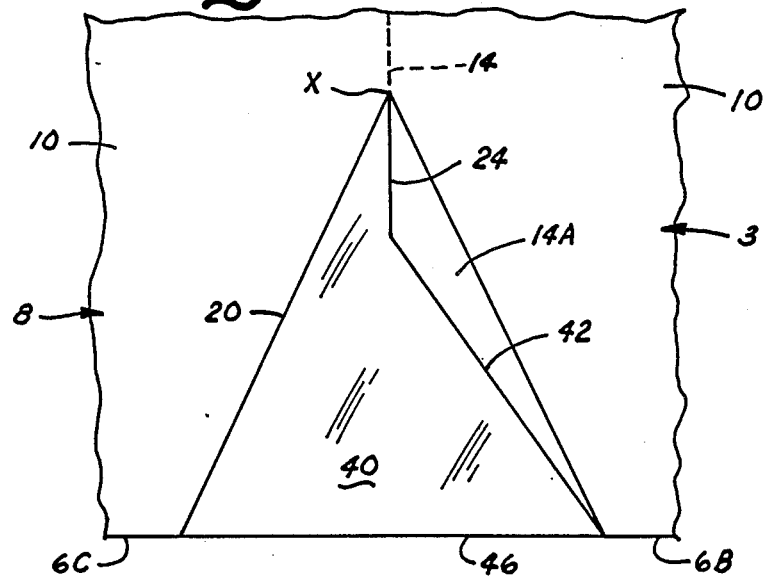
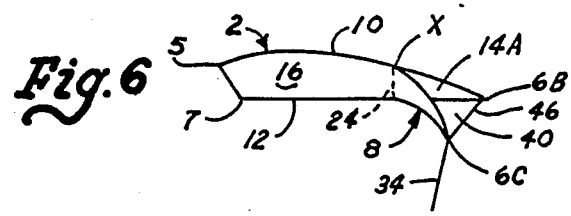

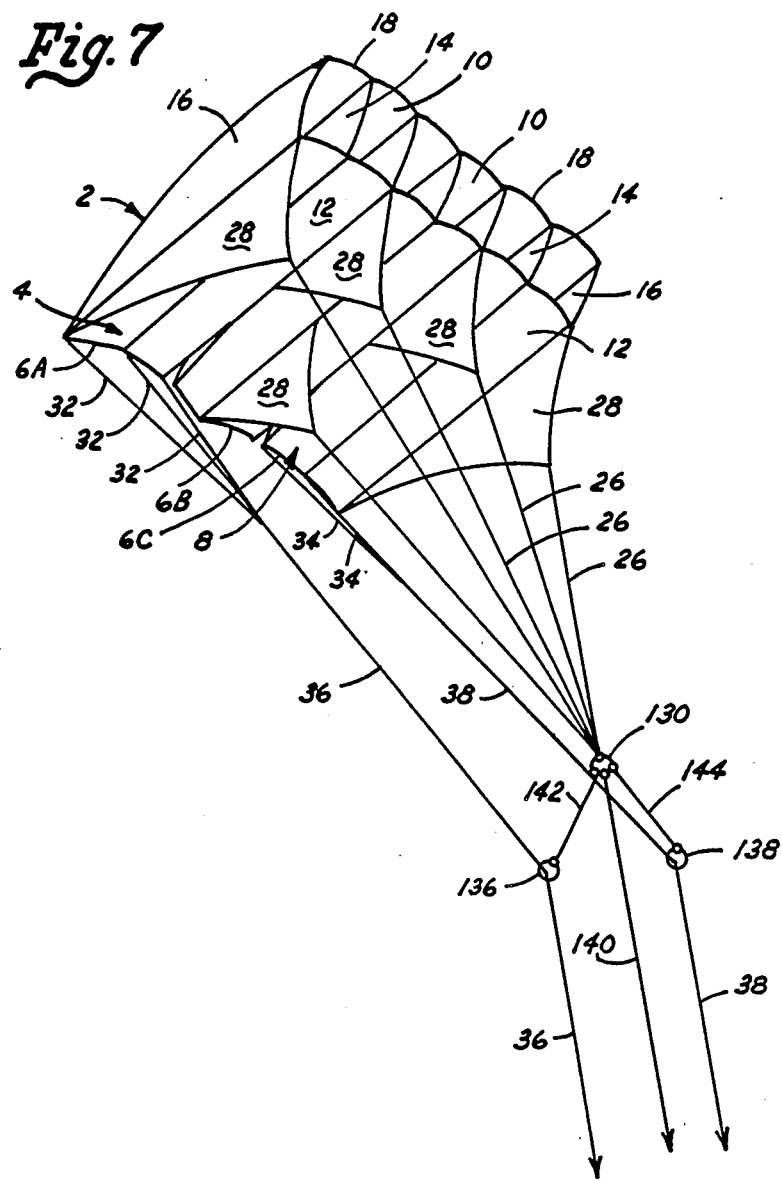

BUILT-IN CONTROL FLAPS FOR A MULTI-CELL WING TYPE CANOPY

TECHNICAL FIELD

This invention relates to parachutes and kites, especially of the type having a ram air, multi-cell, wing type canopy.

BACKGROUND ART

Kites have had tails of various configurations connected to the trailing edge, and parachutes have had multiple control lines secured to the trailing edge of the canopy, filled with ram air, by pulling it downwardly by a control line, or lines, an amount to achieve a desired control. Deforming one end will cause turning, and deforming both ends in a like manner will cause a forward reduction in speed and control descension rate.

Kites usually have a stabilizer connected to the trailing edge including a tail, such as ribbons or drogues of material (of different length) for stabilizing control. Flaps formed from a sheet of flexible material have been used extending rearwardly from the trailing edge of a canopy.

Patents setting forth a background for this invention are: U.S. Pat. No. Re. 26,427; U.S. Pat. Nos. 3,285,546; 3,412,963; 3,524,613; 3,558,087; 3,740,008; 3,749,337; 3,806,071; 3,893,641; 3,944,169; 4,015,801; 4,098,475; 4,191,349; and 4,729,530.

DISCLOSURE OF INVENTION

An object of the present invention is to provide a control device including built-in flexible control flaps on each side of a ram air, multi-cell, wing type canopy. In flight, a control line extends downwardly for actuation for each control flap; individual operation of the control flaps causes rotation and simultaneous operation of the control flaps causes a braking effect.

Another object of the invention is to provide a built-in ram air control flap for a ram air, multi-cell, wing type canopy, at the rear portion of an end cell means, or cells, where air entering the cell means, or cells, enters the control flap, with said end cell means, or cells, being split from the inner cells of the center portion of the canopy for a length from the trailing edge so that said ram air control flap can be pivoted downwardly without distorting the shape of the center portion of the canopy as now practiced. Each split length forms the length of the flap and each control flap has a width of an end cell means, or cells, the length and width of each flap being determined by the performance and the control desired of the canopy.

A further object of the present invention is to provide a control for a ram air, multi-cell, wing type canopy including built-in flexible control flaps, one on each side thereof. Each built-in flexible control flap is formed by splitting a regular canopy at an inner rib, located inwardly from each end rib, from the trailing edge of the canopy forwardly for a predetermined distance. The inner rib is formed as two parts, one part covering the extending side of the cell of the center portion of the canopy and the other part covering the extending side of the cell of a control flap, from where the control flaps start to the trailing edge of the canopy.

Another object of the invention is to provide an inner rib extending between the end cell of the center portion of the canopy and each adjacent cell having a control flap, said inner rib forming a "Y" shape from the trailing edge of the canopy to the forward edges of the upper and lower flexible sheets.

A further object of the invention is to provide a connecting piece of flexible material between the adjacent sides of a control flap and the center portion of the canopy forming a flow guide and seal. To permit flow through said flexible material, openings, or slits, can be made therein. Strips of material can be used in place of the connecting piece of flexible material with slits being formed between the strips, or a mesh material can also be used. The size of openings is selected to achieve a desired performance during flight, and at different opening speeds.

Another object of the invention is to provide a flow guide and seal of flexible material between the adjacent sides of a control flap and the center portion of the canopy where the flexible material is attached to the bottom edge of the control flap and the top edge of the center portion of the canopy, with the forward part connected to the point where the control flap and center portion of the canopy meet.

BRIEF DESCRIPTION OF THE DRAWINGS

FIG. 4 is an enlarged fragmentary perspective view showing the rear end of a control flap and the rear end of the center portion of a canopy spread apart showing the "Y" shaped inner rib;

FIG. 5 is an enlarged fragmentary perspective view similar to FIG. 4 showing the side of the control flap connected to the side of the center portion of the canopy by a fitted piece of flexible material, such as used to form the canopy;

FIG. 6 is a view similar to FIG. 2 showing a connecting piece of flexible material between the adjacent sides of a control flap and center portion of the canopy;

FIG. 7 is a view of a canopy with built-in control flaps and having a support line and two control lines connected by a bridle arrangement;

Best Mode for Carrying Out the Invention

Figure 1:
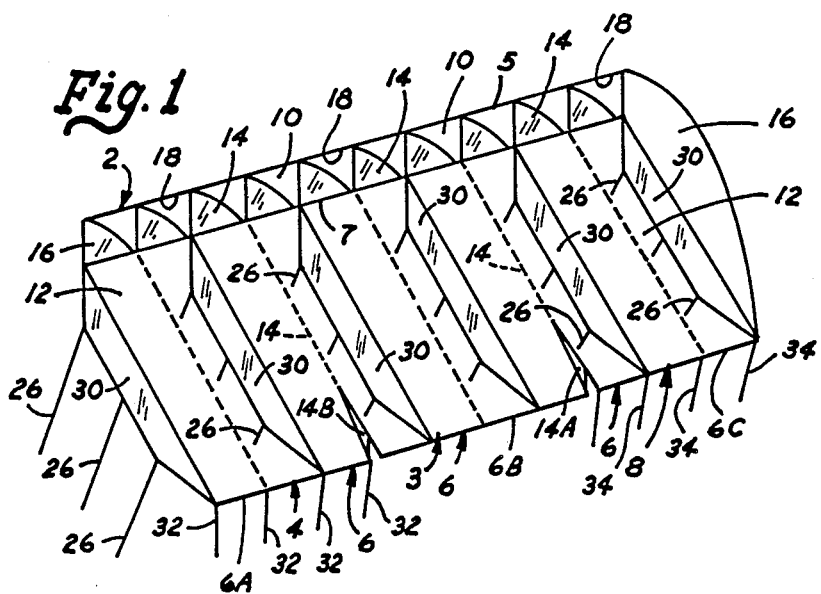
FIG. 1 is a perspective view from below of a ram air, multi-cell, wing type canopy with a plurality of keel members extending from rib members connected to support, or suspension, lines.
Figure 2:
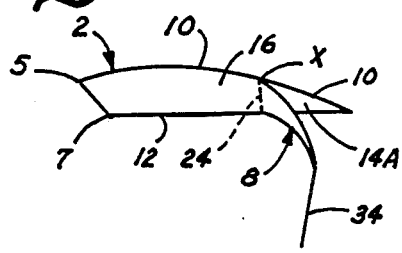
FIG. 2 is a side view of the canopy and control flaps taken from the right of FIG. 1 without the keel members, showing a downward position of the control flap, leaving the center portion of the canopy without distortion.

The ram air, multi-cell, wing type canopy 2 of FIG. 1 includes a built-in control flap 4 on one side of a center portion 3 of said canopy 2 and a built-in control flap 8 on the other side of center portion 3 of canopy 2. The ram air, multi-cell, wing type canopy 2 comprises an upper flexible sheet, or wall, 10 connected to a lower flexible sheet, or wall, 12 by a plurality of spaced flexible inner ribs 14 and end ribs 16, generally having an airfoil shape. These spaced ribs 14, and end ribs 16, form cells, 18. The forward edges 5 and 7 of the upper flexible sheet, or wall, 10 and lower flexible sheet, or wall, 12, respectively, are spaced apart to provide an open ram air scoop for inflating the cells 18. The trailing edges of the upper flexible sheet, or wall, 10 and lower flexible sheet, or wall, 12 are shown connected to form a segmented trailing edge 6, which is separated into three parts, 6A, 6B, and 6C to accommodate the built-in control flaps 4 and 8, and the center portion 3 of the canopy. Any of the trailing edge parts 6A, 6B, and 6C may have openings, as is well known in the art, if desired. The trailing edge parts 6A and 6C are formed on the built-in control flaps 4 and 8, respectively, and trailing edge part 6B is formed on the center portion 3 of said canopy 2.

Figure 3:
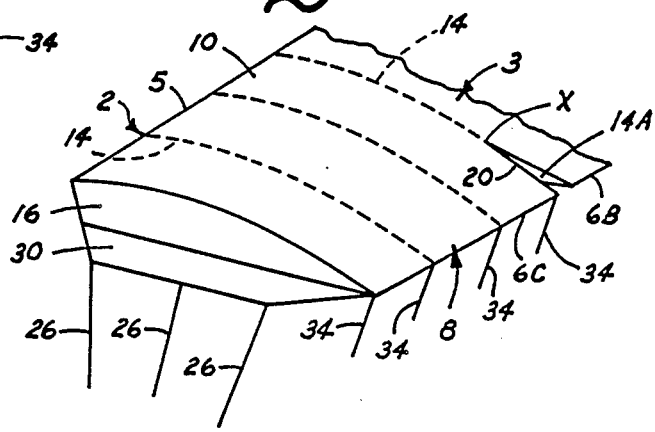
FIG. 3 is a perspective view from above one end of the canopy of FIG. 1 showing the control flap with control lines extending below the canopy for manual or automatic operation.

Each built-in flexible control flap 4 and 8 is formed by splitting a canopy 2 at an inner rib 14, located inwardly from each end rib 16, from the segmented trailing edge 6 of the canopy 2 forwardly for a predetermined distance to a point X (see FIG. 4). The inner rib 14 adjacent each flap 4 and 8 extends to the trailing edge 6B of the center portion 3 of the canopy 2 with an exposed rib portion 14A rearward of point X. A rib portion 14B approximately the size of rib portion 14A is fixed to the upper flexible sheet 10 along line 20, to the lower flexible sheet 12 along line 22, and to the inner rib 14 where they meet at line 24, closing the rear part of flap cell 18 adjacent the exposed rib portion 14A of end cell 18 of the center portion 3. Rib portion 14B is located adjacent rib portion 14A when the canopy is inflated as shown in FIGS. 1 and 3.

Supporting, or suspension, lines 26 are connected to the lower flexible sheet, or wall 12, by keels 30 extending from a plurality of inner ribs 14 and both end ribs 16. The supporting, or suspension, lines 26 extend to a harness for supporting a parachutist, or load, and control lines 32 extend to a single control line 36 and control lines 34 extend to a single control line 38. Each single control line 36 and 38 can extend to a manual control operable by the parachutist, or to any automatic control device to control a cargo drop. Any desired harness connection known in the art can be used.

While keels 30 are shown for connecting the supporting, or suspension, lines 26 to the lower flexible sheet, or wall, 12, many other connecting means may be used as disclosed in the prior art. For example, the supporting, or suspension, lines 26 can be connected directly to the lower flexible sheet, or wall, 12, or by a plurality of small flares, or wedge-shaped material. Both connecting flares and direct connection of the supporting, or suspension, lines 26 to the lower flexible sheet, or wall, 12, are shown in U.S. Pat. No. 3,285,546 (U.S. Pat. No. Re. 26,427) to Domina C. Jalbert.

To maintain a straight flow under the center portion 3 of canopy 2 when a control flap 4 or 8 is pulled down to effect a desired canopy flight movement, a flexible seal member 40 is connected between the adjacent sides of rib portion 14A and rib portion 14B.

In a construction built (see FIG. 5), a four (4) sided flexible seal member 40, comprises of material such as used in the rest of the canopy, had one side edge connected to line 42 at the bottom of rib portion 14A; had another side edge connected to line 20 at the top of rib portion 14B, and had a small forward edge between the two side edges connected to line 24. A rearward edge 46 on flexible seal member 40, between the two side edges, extended between the adjacent ends of trailing edge parts 6B and 6C. The operative position of a flexible seal member 40, when the trailing edge 6C is pulled to a full downward position, is shown in FIG. 6.

Referring to FIG. 7, a perspective view is shown of a canopy smaller than that of FIG. 1, with the supporting, or suspension, lines 26 connected directly to a main supporting ring 130; main supporting ring 130 being in turn connected to a tether or supporting line 140. Control lines 36 and 38 are connected to the trailing edge 6A and 6B, respectively, of each of the control flaps 4 and 8 by intermediate lines 32 and 34, respectively. Two secondary control rings 136 and 138 are connected to said main supporting ring 130. One secondary control ring is attached to each side of the main supporting ring 130 by a length of cord; a cord 142 connects secondary control ring 136 to the right side of supporting ring 130 and a cord 144 connects secondary control ring 138 to the left side of supporting ring 130. Control line 36 extends downwardly from intermediate line 32 and the trailing edge 6A of control flap 4 through secondary control ring 136 and down to a controller on the ground, if tethered, or to a remote control device; while control line 38 extends downwardly from intermediate line 34 and the trailing edge 6C of control flap 8 through secondary control ring 138 and down to control means such as control line 36 above.

Figure 8:
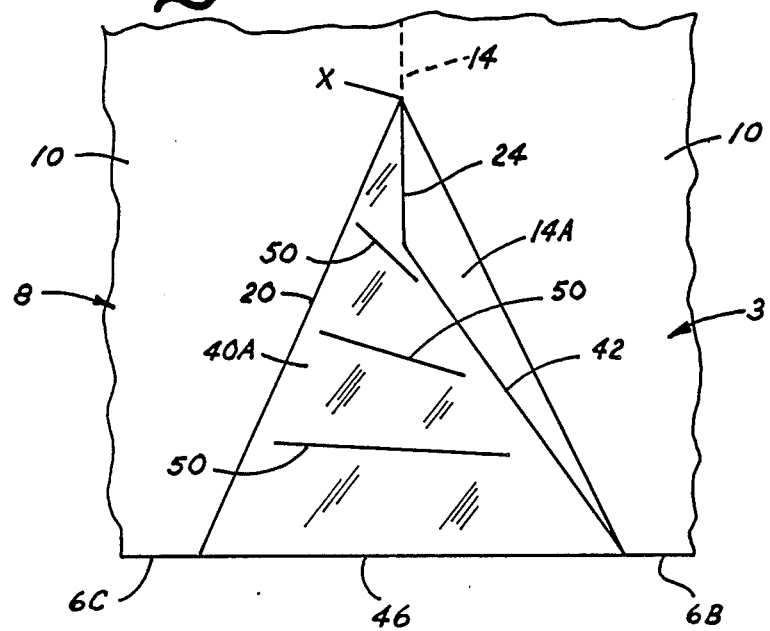
FIG. 8 is an enlarged fragmentary perspective view similar to FIG. 5 showing slits in the fitted piece of flexible material permitting limited flow therethrough.
Figure 9:
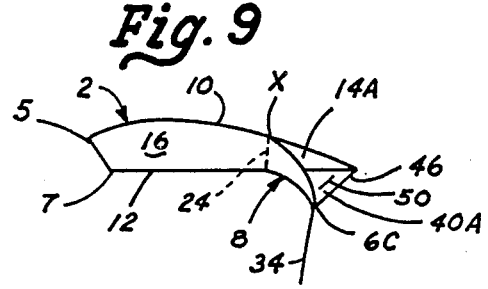
FIG. 9 is a view similar to FIG. 6 with slits in the connecting piece of flexible material.

Referring to FIG. 8, the connecting piece of flexible material, or seal member, 40A, between the adjacent cell of a control flap 4 or 8 and cell of center portion 3 is formed having a plurality of slits 50 to provide a limited flow through said seal member 40A. Slits 50 provide a valving effect. During control flap movement, air is permitted to flow through said slits. A connecting piece of flexible material, formed as mesh, could be used, having a fixed open area through the mesh opening.

In canopies built, the length of the built-in control flaps 4 and 8 was made from approximately 20% to 33% of the chord of the canopy 2, and the width of the flaps 4 and 8 was made from approximately 20% to 33% of the span of the canopy 2. These sizes provided the control to operate the test canopies 2 as desired. While flaps 4 and 8 have had lengths of approximately 20% to 33% of the chord of a canopy 2 perform as desired, and widths of approximately 20% to 33% of the span of a canopy perform as desired, one skilled in the art will realize that built-in control flaps 4 and 8 having different lengths and widths from these can be used.

One canopy 2, which was photographed in flight, had fourteen (14) cells 18 with the rear ends of four (4) cells on each side forming the control flaps 4 and 8; the center portion 3 had six (6) cells 18. This construction made each control flap 4 and 8 approximately 30% of the span of the canopy 2. The length of the split from the trailing edge 6 to an inner point X forming the length of the flaps 4 and 8, was approximately 20% of the chord of the canopy 2.

It can be seen that if a canopy 2 is split between ribs 14, and not adjacent to a rib 14, to form control flaps 4 and 8 then a separate rib portion 14B is used on both sides of the split to close the canopy 2.

I claim:

1. In combination, a ram air multi-cell wing type flexible canopy, said canopy having a front end and rear end, said canopy having a ram air inlet at the front end and a trailing edge at the rear end, a built-in control flap being located in each side of said canopy at the rear portion thereof, each built-in control flap being separated lengthwise by being split from the center portion of the canopy between the built-in control flaps so that each control flap can be bent downwardly without deforming the center portion of the canopy.

2. A combination as set forth in claim 1 wherein a piece of flexible material connects the side of each built-in control flap to its adjacent separated side of the center portion of the canopy to seal between them, each piece of flexible material being of a length to permit its cooperating built-in control flap to move downwardly for a distance without pulling on the center portion of the canopy.

3. A combination as set forth in claim 1 wherein each built-in control flap receives ram air through said canopy directly from said ram air inlet at the front end of said canopy.

4. A combination as set forth in claim 2 wherein said canopy has an upper flexible wall and a lower flexible wall, said piece of flexible material connecting each built-in control flap at its upper flexible wall to the adjacent side of the center portion of the canopy at its lower flexible wall.

5. A combination as set forth in claim 2 wherein said piece of flexible material has openings therein.

6. In combination, a ram air multi-cell wing type flexible canopy, said canopy having an upper wall and a lower wall, said walls having a forward ram air inlet therebetween, said walls forming a trailing edge, end walls connecting said upper wall and lower wall, intermediate ribs spaced between said end walls forming a plurality of cells extending from said forwrard ram air inlet to said trailing edge, said upper wall and lower wall being split lengthwise from said trailing edge forwardly at a location inwardly from each end rib forming the upper and lower surfaces of built-in end control flaps and the upper and lower surfaces of the center portion of the canopy between the built-in end control flaps, said upper wall and lower wall being connected on each side of each split by flexible material forming an inner end wall of each built-in end control flap and separate flexible material forming each outer end wall of the center portion of the canopy between the built-in end control flaps, each built-in end control flap being separated lengthwise by being split lengthwise from the center portion of the canopy between the built-in end control flaps so that each end control flap can be bent downwardly without deforming the center portion of the canopy.

7. A combination as set forth in claim 6 including means for supporting a load connected to the lower wall of said canopy, and control lines connected to the trailing edges of said built-in end control flaps for actuating said built-in end control flaps together or separately, said control lines positively moving said built-in end control flaps in a downward direction, said built-in end control flaps being biased in an upward direction to a position in line with the center portion of the canopy by ram air delivered to said built-in end control flaps from said forward ram air inlet.

8. A combination as set forth in claim 6 wherein a piece of flexible material connects the inner end wall of each built-in end control flap and the adjacent separated outer end wall of the center portion of the canopy to seal the lengthwise split between them, each piece of flexible material being of a length to permit its cooperating built-in control flap to move downwardly for a distance without pulling on the center portion of the canopy.

9. A combination as set forth in claim 8 wherein said piece of flexible material connects the top of the inner end wall of each built-in end control flap and the bottom of the adjacent outer end wall of the center portion of the canopy between the built-in end control flaps.

10. A combination as set forth in claim 8 wherein said piece of flexible material has openings therein.

11. In combination, a ram air multi-cell wing type flexible canopy, said canopy having an upper wall and a lower wall, end walls connecting said upper wall and lower wall, said upper, lower and end walls having a ram air inlet, said upper and lower walls forming a trailing edge, intermediate ribs spaced between said end walls forming a plurality of cells extending from said ram air inlet to said trailing edge, said upper wall and lower wall being split from said training edge forwardly at a location adjacent in intermediate rib inwardly from each end wall forming the upper and lower surfaces of built-in end control flaps and the upper and lower surfaces of the center portion of the canopy between the built-in end control flaps, said upper wall and lower wall being connected on one side of each split by the adjacent intermediate rib portion and on the other side by a flexible material insert, said adjacent intermediate rib portions and flexible material inserts forming an inner end wall of each built-in end control flap and outer end walls of the center portion of the canopy between the built-in end control flaps, each built-in end control flap being split from the center portion of the canopy between the built-in end control flaps so that each end control flap can be bent downwardly without deforming the center portion of the canopy.

12. A combination as set forth in claim 11 wherein each flexible material insert is connected to its adjacent intermediate rib portion at its forward end, said flexible material insert being shaped like said intermediate rib portion.

13. A combination as set forth in claim 12 wherein a piece of flexible material connects the forward end of each intermediate rib portion to the side of each built-in control flap and its adjacent side of the center portion of the canopy.

14. A combination as set forth in claim 13 wherein the piece of flexible material is connected to the top of the side of each built-in control flap and connected to the bottom of its adjacent side of the center portion of the canopy.

15. A combination as set forth in claim 11 wherein each flexible material insert forms a Y-shaped rib with its intermediate rib.

16. A combination as set forth in claim 11 wherein said upper wall and lower wall is split at the rear portion of said canopy.

17. A combination as set forth in claim 16 wherein said rib portion extends up to 33% of the chord of the wing type canopy.

18. A combination as set forth in claim 11 wherein a piece of flexible material connects the adjacent intermediate rib portion and the flexible material insert between each built-in control flap and the adjacent side of the center portion of the canopy.

* * * * *